United States Patent

Ayling et al.

[15] 3,688,280

[45] Aug. 29, 1972

[54] MONOLITHIC MEMORY SYSTEM WITH BI-LEVEL POWERING FOR REDUCED POWER CONSUMPTION

[72] Inventors: John K. Ayling, Fishkill; Richard D. Moore, Hopewell Junction, both of N.Y.

[73] Assignee: International Business Machines Corporation, Armonk, N.Y.

[22] Filed: Sept. 22, 1970

[21] Appl. No.: 74,432

[52] U.S. Cl. ..........340/173 FF, 307/238, 340/173 R

[51] Int. Cl..........G11c 7/00, G11c 11/40, G11c 5/02

[58] Field of Search......307/238; 340/173 R, 173 FF

[56] References Cited

UNITED STATES PATENTS

| | | | |
|---|---|---|---|
| 3,618,046 | 11/1971 | Bryant | 340/173 FF |
| 3,423,737 | 1/1969 | Harper | 340/173 FF |
| 3,505,573 | 4/1970 | Wiedmann | 340/173 FF |
| 3,292,008 | 12/1966 | Rapp | 340/173 FF |

OTHER PUBLICATIONS

Schuenemann, Address Decoder, 9/69, IBM Technical Disclosure Bulletin, Vol. 12 No. 4, p. 637

Sechler, Memory Cell, 8/70, IBM Technical Disclosure Bulletin Vol. 13 No. 3, p. 618–619

Bodendorf, Polarity-Hold Circuit with True and Complement Output, 6/71, IBM Technical Disclosure Bulletin, Vol. 14 No. 2, p. 416

*Primary Examiner*—Bernard Konick

*Assistant Examiner*—Stuart Hecker

*Attorney*—Hanifin and Jancin and Julius B. Kraft

[57] ABSTRACT

A monolithic integrated semiconductor circuit in which both the memory array proper and the addressing and decoding support circuitry are subjected to two power levels, i.e. a low power level when the memory array is in the non-selected or inactive state and a higher level of power necessary to render the decode and address circuitry operational and to make the lines of the array selected by said support circuitry operational for reading and writing into the memory.

In order that the time required for the selection of a given line in the memory array, either a row or a column, be held to a minimum, decoding means provide an output which applies to all of the gates associated with each of the rows and/or columns, the preselected patterns required to activate a row or column during the low power or inactive state. Then, during the active state when higher power is applied, the decode circuitry functions to remove the preselected signal necessary to activate a row or column from all of the gates except the gate associated with the column or row to be activated. By functioning in this manner, the circuitry of the present invention avoids a time lag when the higher level is applied which would otherwise be necessary in order to bring the preselected input signal applied to the selected gate up to the level necessary to activate the selected column or row.

12 Claims, 7 Drawing Figures

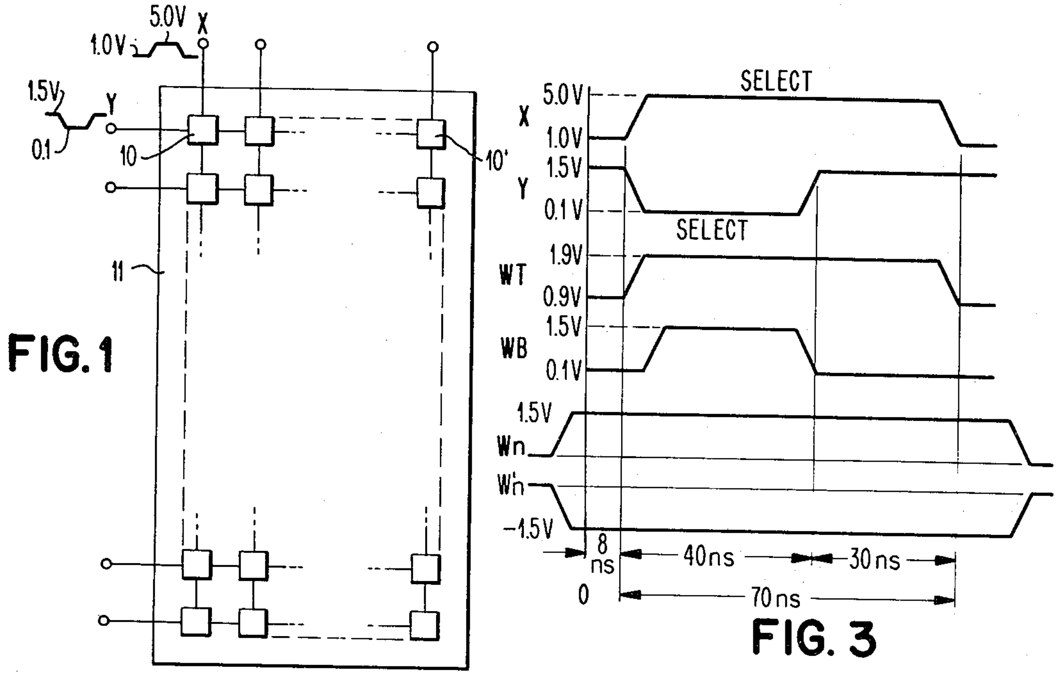

FIG. 1, FIG. 3

| FOR SELECTION OF GATE | THE FOLLOWING GENERATOR OUTPUTS SHOULD BE UP | | | |
|---|---|---|---|---|
| T 101 | $\overline{W3}$ | W2 | W1 | W0 |
| T 102 | $\overline{W3}$ | W2 | W1 | $\overline{W0}$ |
| T 103 | $\overline{W3}$ | W2 | $\overline{W1}$ | W0 |
| T 104 | $\overline{W3}$ | W2 | $\overline{W1}$ | $\overline{W0}$ |
| T 105 | $\overline{W3}$ | $\overline{W2}$ | W1 | W0 |
| T 106 | $\overline{W3}$ | $\overline{W2}$ | W1 | $\overline{W0}$ |
| T 107 | $\overline{W3}$ | $\overline{W2}$ | $\overline{W1}$ | W0 |
| T 108 | $\overline{W3}$ | $\overline{W2}$ | $\overline{W1}$ | $\overline{W0}$ |
| T 109 | W3 | W2 | W1 | W0 |
| T 110 | W3 | W2 | W1 | $\overline{W0}$ |
| T 111 | W3 | W2 | $\overline{W1}$ | W0 |
| T 112 | W3 | W2 | $\overline{W1}$ | $\overline{W0}$ |
| T 113 | W3 | $\overline{W2}$ | W1 | W0 |
| T 114 | W3 | $\overline{W2}$ | W1 | $\overline{W0}$ |
| T 115 | W3 | $\overline{W2}$ | $\overline{W1}$ | W0 |
| T 116 | W3 | $\overline{W2}$ | $\overline{W1}$ | $\overline{W0}$ |

Wn IS TRUE OUTPUT TERMINAL OF n GENERATOR $\overline{Wn}$ IS COMPLETE OUTPUT TERMINAL OF n GENERATOR

FIG. 4

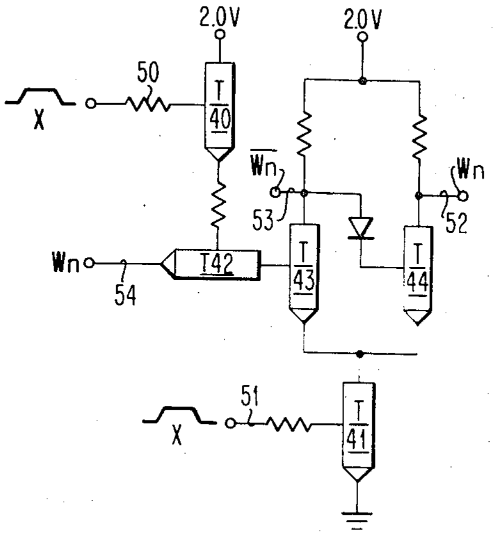

FIG. 5

INVENTORS
JOHN K. AYLING
RICHARD D. MOORE
BY
J. B. Kraft
ATTORNEY

MONOLITHIC MEMORY SYSTEM WITH BI-LEVEL POWERING FOR REDUCED POWER CONSUMPTION

BACKGROUND OF THE INVENTION

1. Field of the Invention

The present invention relates to monolithic integrated circuit semiconductor memory and more particularly to circuitry for high-speed monolithic memories in which both the memory array proper and the support circuitry are bi-level powered in order to reduce power dissipation.

2. Description of the Prior Art

With the ever increasing microminiaturization of integrated circuit devices associated with computer memories, the problem of power dissipation resulting in undesirable heating of the devices becomes more pronounced. As the density of devices per unit area of the integrated monolithic memory substrate is increased, the needs becomes greater for expedients which will minimize heating effects and thereby permit the memory itself and the support circuitry to be maintained at operating temperatures. Where the memory itself or the storage array proper is a monolithic memory cell array, the heating effect is a significant problem because of the extensive power dissipation within the monolithic array. To reduce this power dissipation, it has been previously suggested that there be employed a high power level during the active condition of the cells in the array, and a low power level when the cells are in a standby or storage condition. In such a case, high-speed response to a "read" signal or high-speed switching due to a "write" signal is still obtained since the power level during the "read" or "-write" is high. Copending application, Ser. No. 791,477 W D Pricer filed Jan. 15, 1969 now U.S. Pat. No. 3,621,302 and assigned to the same assignee as the present application, describes a monolithic memory array which is bi-level powered by circuitry which provides a constant current source when the cells are in a standby, low power condition, and a constant voltage source to increase the power level when the cells are in the active condition. The memory of the present system may utilize the circuitry described in that copending application to provide the high and low level powering of the selected lines in the memory array.

The device density and consequently power dissipation within the monolithic memory chips is presently being even further increased with the inclusion of the decode and address support circuitry associated with a monolithic memory array on the same chip as the array proper. This tendency towards increased power dissipation within the chip has made it necessary for the art to seek feasible integrated circuitry providing bi-level powering, not only for the memory array, but also for the support circuitry wherein the support circuitry is in a low power or no power state when the memory array is in the inactive state, i.e. no line on the array is being selected, and in a high power state when necessary to make a selection on the array during a "read" or "write" cycle.

Copending patent application Ser. No. 791,306, R. A. Henle, filed Jan. 15, 1969 now U.S. Pat. No. 3,599,182 and assigned to the assignee of the present invention, describes one approach for such bi-level powering of support circuitry.

One problem which must be considered in correlating the bi-level powering of the support circuitry with that of the memory array proper, is the time factor involved in generating within the decode circuitry the address signal necessary to activate the gating circuit for the selected memory line. Since the supporting circuitry has been in a low power or off state during the dormant or inactive period, a time lag is customarily experienced in decoding the input to the supporting circuitry and applying the signal required to activate the selected line by applying the proper signal to the gate associated with the line.

SUMMARY OF THE INVENTION

Accordingly, it is a primary object of the present invention to provide an integrated circuit memory array in which both the memory array proper and the supporting address and decode circuitry are both bi-level powered.

It is another object of the present invention to provide a monolithic memory array having optimum correlation between the bi-level powering of the support circuitry and that of the memory array proper in order to provide high-speed selection of lines in the array.

It is a further object of the present invention to provide bi-level powered support circuitry for a monolithic memory array in which time factor involved in applying the select signal required to activate an array after the application of the high power level to the support circuitry, is maintained at a minimum.

It is yet another object of the present invention to provide a novel bi-level power true-complement generator utilizable in the aforementioned bi-level power support circuitry.

In a bi-level powered monolithic memory array, when the high power level is applied to activate the memory array, whether a resulting high voltage level will be applied to all the memory cells in a given cline (column or row) will be determined by whether the particular gating means associated with said line will permit the application of said high voltage level to said line. In order for there to be a proper random access selection in the memory array, only the gating means associated with a selected line should permit the application of the high voltage level to said line; the gating means associated with all the other lines should prohibit the application of high voltage levels to these non-selected lines. Accordingly, only the gate receiving a preselected data signal pattern input should permit the application of the high voltage level to the line of cells associated with said gate.

In order to selectively apply the preselected data signal pattern to only the gate associated with the selected line, there is provided decoding means for receiving a pattern of binary signals representative of a selection of one of said lines and for applying to the gating means associated with said selected line, the preselected data signal pattern input required for the gating means to connect said voltage level to said selected line. Means are provided for simultaneously applying a gating signal to each of the gating means when the array is being placed in the high power or active state, a coincidence of such a gating signal when the preselected data signal patterns on one of said gates will result in the selection of the line in the array associated with said gate, and the gate will cause a high voltage level to be applied to said line. In order to insure that the selected gate is activated with a minimum of time lag upon the application of the high power level to the chip containing the array, the bi-level powered decoding means include means for applying the preselected data signal pattern input required to activate a line to each of the gating means during the periods when power is not being applied to the decoding means. Since during the same period, low power is being applied to the array, there will be no gating signal applied to said gates and consequently, the lines will not be activated. Then, when the high power level is applied to both the array and the decoding means, the preselected data signal pattern will be removed by the decoding means from all of the gating means except the gating means associated with selected line, whereby the preselected data signal pattern input is applied only to the gating means of the selected line coincidently with the application of the gating signal. This minimizes any time lag after the application of the high power level to the decoding means which would result in a delay in the application of the preselected data signal pattern input to the selected gate since this pattern input has been maintained at said gate during the low power or inactive period of the support circuitry.

The foregoing and other objects, features and advantages of the invention will be apparent from the following more particular description and preferred embodiments of the invention as illustrated in the accompanying drawings.

BRIEF DESCRIPTION OF THE DRAWINGS

FIG. 1 is a diagrammatic plan view to illustrate the disposition of a plurality of chips or supported chips on a supporting substrate such as a circuit board.

FIG. 3 is a timing chart showing the voltage waveform of the inputs to the chip and the voltage levels at the top and bottom of a row in the array.

FIG. 4 is a table setting forth the true-complement generator outputs necessary to provide the preselected data signal input pattern for each of the gates associated with one of the lines in the memory storage cell array.

FIG. 5 is a schematic circuit diagram of another embodiment of a true-complement generator which may be substituted for each of the true-complement generators shown in FIG. 2B.

DESCRIPTION OF THE PREFERRED EMBODIMENTS

FIG. 1 illustrates the arrangements of chips 10 on a deporting substrate or board 11. Each of chips 10 contains a monolithic memory array of storage cells as well as the required address and supporting circuitry to be hereinafter described with respect to FIGS. 2A and 2B. Substrate 11 may be a printed circuit board. Preferably, each of chips 10 is mounted on a ceramic substrate (not shown for convenience of illustration) which may be plugged into printed circuit board 11. In the bi-level powering scheme, in which the present invention is utilized, the chips on a given board 11 are in the inactive or low power state until information is to be written into or read out of one or more cells in the memory array on the chip. When this is to take place, a pair of voltage signals X and Y, shown in the timing chart of FIG. 3, are simultaneously applied to a selected X and Y terminal of the circuit board 11. For example, in FIG. 1 the X signal is shown applied to the first column and the Y signal is applied to the first row. This results only in the activation of chip 10. The determination that chip 10 should be activated is made through decode and address circuitry, which may be conventional for this purpose, and is not shown and not part of the present invention. Assuming now that chip 10 is activated, let us refer to FIGS. 2A and 2B which illustrate the memory array and the support circuitry on chip 10 or any of the chips 10.

Figures 2, 2A:
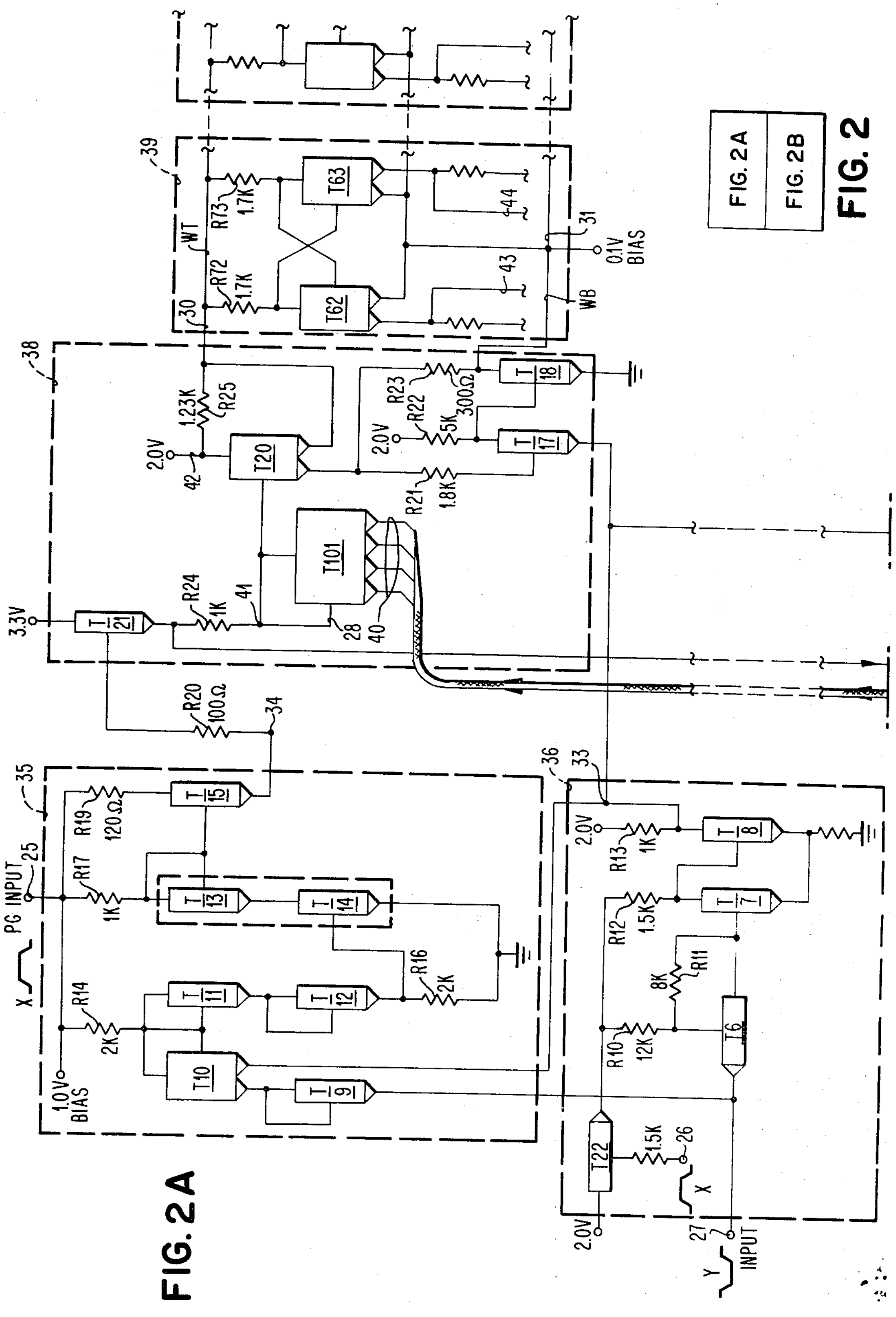
FIGS. 2A and 2B combine to a composite circuit diagram of a portion of the circuitry of the memory array and the supporting circuits on a monolithic chip in a preferred embodiment of the present invention.
Figure 2B:
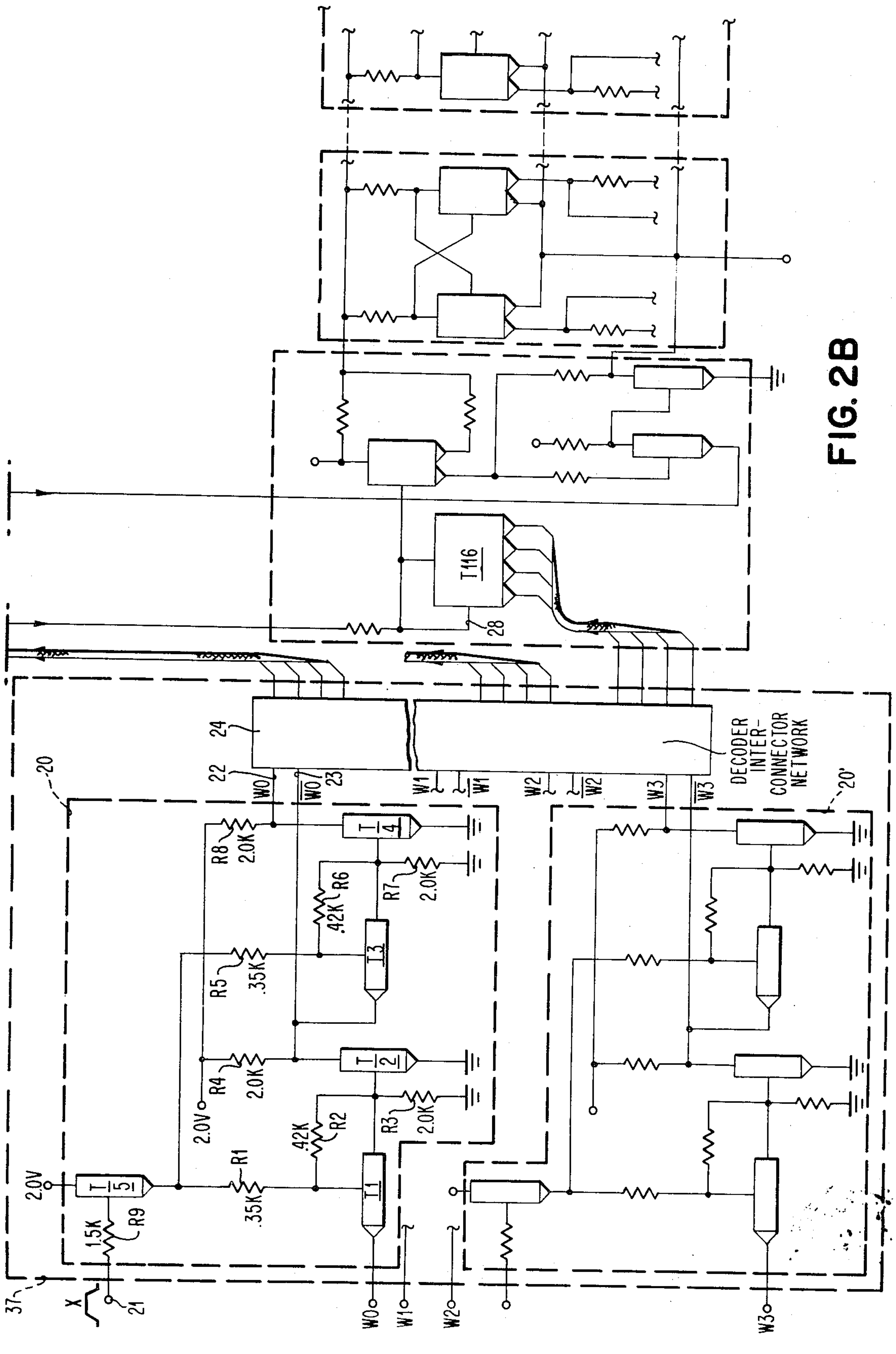

Since the circuitry in FIGS. 2A and 2B is digital or non-linear in characteristics, for convenience in description, the terms up and down will be used to describe the voltage states of various points throughout the circuit; up will be representative of a binary "1" and down will be representative of the binary "0" voltage level.

The support circuitry may be considered to be made up of four basic circuit sections, each of which has been enclosed within a dotted box in FIGS. 2A and 2B: chip select circuit 35, delay circuit 36, decoder circuit 37 comprising four true-complement generators 20, one for each of the signal inputs WO through W3 and line address circuits 38. Each of the line address circuits 38 is associated with one of the rows of storage cells in the memory array. Since there are sixteen horizontal lines or rows, each chip has sixteen address circuits 38. Each line or row has eight memory cells 39, arranged in eight lines or columns to form the memory array or matrix.

Considering now the structure and operation of decode circuit 37, it comprises four true-complement generators 20, one for each of data inputs WO through W3. Each of the true-complement generators 20 comprises a pair of common emitter transistors T2 and T4, a transistor T1 for selectively connecting the input from the input terminal, e.g. W0 to the base of transistor T2, and transistor T3 for selectively connecting the collector of transistor T2 to the base of transistor T4. The true and the complement of the binary bit applied to input W0 being respectively taken from output terminal 22 (true, W0) and output terminal 23 (complement, $\overline{WO}$). When the chip is in the non-selected or inactive state, i.e. no X pulse is being applied to input terminal 21, the base of transistor T5 is down, transistor T5 is non-conductive. Accordingly, the emitter of T5 is down. Consequently, the input to the bases of transistors 1, 2, 3 and 4 is down and these transistors are non-conductive. This results in the collectors of T2 and T4 being up. Consequently, the true output terminal 22 is up or in the binary "1" state and the complement output terminal 23 is also up or in the binary "1" state. Consequently, all four true-complement generators 20 provide all outputs in the binary "1" state and all inputs to the decoder interconnector network 24 are in the binary "1" or up state. Thus, while the decoder circuits are in the inactive state, although no power is being utilized within the true-complement generators 20, there is an up output on both terminals in each of these generators. During this inactive period, prior to the application of power to the decoding circuitry, a binary signal input representative of the line or row selected is applied to the four input terminals W0 to W3. These pulses are illustrated in the timing chart of FIG. 3 with pulse Wn, representing the input when a binary "1" is applied to a terminal, and pulse W'n being a binary "0." As shown in the timing chart of FIG. 3, the Wn or W'n pulses are applied to the input terminals during the inactive state and are sustained through the high power level or active state of the memory array chip. Pulses Wn and W'n are produced by any appropriate computer address circuitry and the addressing system which produces these pulses is not part of the present invention.

Let us consider now what occurs in a true-complement generator when the high power level or active level is applied to the chip. When pulse X is applied to terminal 21, the base of T5 comes up rendering T5 conductive. The emitter of T5 is in the up state. If there has been an input at terminal W0 indicative of a binary "1" (pulse Wn), the emitter of transistor T1 will be in the up state. Consequently, T1 will be non-conductive bringing the base of transistor T2 to the up state, and thereby rendering T2 conductive. This in turn will bring the emitter of transistor T3 down and T3 will be conductive, thereby bringing the base of transistor T4 down and rendering transistor T4 non-conductive. Accordingly, when the input to terminal W0 is up for a binary "1," the true output on terminal 22 taken from the collector of non-conductive transistor T4 will be up and the complement output on terminal 23 taken from the collector of conductor T2 will be down.

Conversely, if when pulse X is applied to terminal 21, input terminal W0 is down (W'n, timing chart, FIG. 3) transistor T1 will be conductive, transistor T2 will be non-conductive, T3 will be non-conductive, and T4 will be conductive. This will provide a down output on true terminal 22 and an up output on complementary terminal 23.

Considering now how the input of the four true-complement generators are interconnected to the line address circuit 38 associated with each of the 16 rows, the eight outputs: W0, $\overline{W0}$, W1, $\overline{W1}$, W2, $\overline{W2}$, W3, and $\overline{W3}$ are applied to decoder interconnector network 24 which in turn connects various combinations of the eight outputs of decoder circuit 37 to each of the gates in the 16 address circuits 38 associated with the 16 rows in the memory array. The combination of decoder circuit output applied to each of the 16 gates should be such that no two gates have the same combination applied to it. Gates T101 and T116 which are shown in FIGS. 2A and 2B are the gates associated with the first row and the 16th row. The table in FIG. 4 shows the combination of output from the generators in decode circuit 37 applied to each of the gates. For example, to gate T101 the following inputs are applied: W3, which is the complement output from the true-complement generator associated with input W3, and W2, W1 and W0 which are the true outputs from the generators respectively associated with inputs W2, W1 and W0.

In the manner which will be hereinafter described, each of the gates, e.g. T101, will only permit a high level voltage to be applied to the cells in the row associated with the gate if all four input terminals 40 are up when the up gating signal is applied to gating terminal 28. This gating signal will appear as a result of the high power level being applied to the chip to activate the chip by the application of the X nand Y inputs to chip select circuit 35 and delay circuit 36. Thus, during the inactive or low power state of the chip, there is no up signal on gating terminal 28 and upon the activation of the chip, an up signal will appear on terminal 28. During the active or high power state in the chip, only one signal input to input terminals W0, W1, W2 and W3 will cause all four terminals of a particular gate to be up. For example, since the generator output terminals coupled to gate T101 are $\overline{W3}$, W2, W1 and W0, generator input terminal W3 must be down so that its complement output terminal $\overline{W3}$ will be up, and generator input terminals W2, W1 and W0 must be up, in order that generator true output terminals W2, W1 and W0 will be up. This combination of inputs to generator 20 will result in all four inputs 40 of only gate T101 being up. None of the other 15 gates will have all four inputs up as a result of this input combination to the true-complement generator.

On the other hand, during the inactive state of the chip when low power is applied, it has been previously described that all eight outputs from the four generators in the decoder circuit 38 are up; consequently, during this low power or inactive state, each of the 16 gates, T101 through T116, will have all four inputs 40 in the up state. However, since there is no gating signal 28 applied during this inactive state, none of the gates will be activated to permit the application of the higher voltage levels to power their associated lines. Next, upon the activation of the chip through the application of pulses X and Y, the true-complement generator circuits 20 will be activated and, if the inputs to the four input terminals of the circuit are as previously described, only gate T101 will have all four of its inputs 40 remain up when gating pulse 28 is applied thereto. All the other gates will have one or more of their input terminals brought down as a result of the activation of true-complement generators 20. In this manner, all the inputs to the gate of the selective line will be up immediately upon the activation of the chip, and there will be no time lag which would be otherwise expected to occur if all of the inputs 40 were in the down state during the inactive period of the chip. This results in a saving in the order of from 10 to 15 nanoseconds in a row select upon the activation of the chip. The memory cell 39, shown in FIGS. 2A and 2B has circuitry based upon cross-coupled, dual-emitter transistors T62 and T63, each having one emitter coupled to one emitter of the other. These cross-coupled, dual-emitter transistor cells function in the manner described in U.S. Pat. Nos. 3,423,737 and 3,505,573. When these cells are subjected to bi-level powering, whether the cell is in an active or inactive state will be determined by the voltage level on word top (WT) line 30. As shown in the timing chart in FIG. 3, when the cell is in the inactive state, the level at line 30 (WT) is 0.9V, and when the row of cells activated, the level on line 30 (WT) rises to about 1.9V. However, in order to read and write information out of and into the cells in the manner described in U.S. Pat. No. 3,423,737, the voltage level on word bottom (WB) line 31 must be brought up from a level of 0.1V in the inactive cell to a level of 1.5V in the active cell.

In order to insure that the information stored in the cells being activated is not lost when utilizing cell with the transistor configurations shown, it is necessary that line 30 be brought up to its high voltage level prior to line 31 being brought up to its high voltage level and that line 30 remain at its high voltage level after line 31 has been lowered to its inactive level during the transition of the cell from the active back to the inactive state. Otherwise, if the voltage level on line 31 ever exceeds the voltage level on line 30, the information stored in the cells in the particular row being activated is likely to be lost. In order to insure against such a contingency, there is provided in the operation of chip select circuit 35, delay circuit 36 and address circuit 38, appropriate delays so that as shown in timing chart 3, the high voltage level on (WB), line 31 commences after the high voltage level has been applied to (WT), line 30 and ends prior to the termination of the high voltage level on WT.

With reference to FIGS. 2A and 2B, there will now be described how the chip is activated, the gating signals are applied and the appropriate delays provided in order to correlate WB with respect to WT. If the chip is selected, an X signal will be applied to terminals 25 and 26 and a Y pulse will be applied to terminal 27. The base of transistor T15 will be brought up rendering T15 conductive. This will bring node 34 at the emitter of T15 up, and the base of transistor T21 will be up, thereby rendering T21 conductive. This will bring the emitter of T21 up and in turn, will bring gating terminal 28 applied to gate T101 up. Before proceeding further, it should be noted that in the circuitry being described with respect to FIGS. 2A and 2B, several of the transistors have their bases shorted to their collectors. Thus shorted, the transistor in effect functions as a diode with the base-emitter junction being the diode junction.

In the immediately preceeding description, it was stated that upon the application of the X pulse to terminal 25, the base of transistor T15 was up, thereby permitting the path described. However, in order for the base of transistor T15 to be up, it is necessary for transistor T13 to be non-conductive. Transistor T13 is only non-conductive when the Y pulse is applied to input 27 coincidently with the application of the X pulse. With the application of the Y pulse, terminal 27 is lowered to almost ground. In this state, the bulk of the current from terminal 25 to ground will take the path through resistor R14, transistor T10 and T9 to input 27. This is the case because the alternative path to ground would be through transistor T11, transistor T12 and the base-emitter junction of transistor T14. Since this alternative path involves crossing three diode junctions as opposed to two diode junctions in the first path, the bulk of the current will take the path described. Since very little current is passing through transistors T11 and T12, the input to the base of transistor T14 will be down, transistor T14 will be non-conductive and the collector of T14 will be up. Consequently, the emitter of T13 will be up and T13 will be non-conductive.

Let us now go back and consider the effect of an up gating signal on the gating terminal of a transistor such as T101. When terminal 28 goes up, if even one of the four input terminals 40 is down, T101 will be conductive and node 41 will be down. Transistor T20 will be non-conductive and line 30 (WT) will remain at the inactive or non-selected low level of 0.9V. On the other hand, in the case of the selected line, that is where all four input terminals 40 to gate T101 are up, T101 will be non-conductive, node 41 will go up, rendering transistor T20 conductive, and line 30 (WT) will be shorted to the two-volt biasing source at terminal 42 through transistor 20 and will rise to the active level of 1.9V.

It has been previously mentioned that the activation of line 31 (WB) to its higher voltage level of 1.5V is delayed so that it is not raised until the leading edge of pulse WT has been raised, as shown in the timing chart of FIG. 3. This is accomplished in the following manner. Transistor T18 is normally conductive, the collector of T18 is normally down and line 31 is consequently down at its low voltage level. In order to bring line 31 up to its high voltage level, transistor T18 must be rendered non-conductive. Appropriate delay circuitry insures that T18 is not rendered non-conductive until line 30 (WT) is brought up to its high level. In order for T18 to be non-conductive, T17 must be rendered conductive. When T20 is conductive, the base of T17 is brought up. However, this will not render T17 conductive until the emitter of T17 is down. The state of the emitter of T17 is controlled by the Y input pulse in the following manner, in order to insure that T17 is not rendered conductive prior to WT reaching its high voltage level. With the application of the Y voltage pulse to terminal 27 and the X pulse to terminal 26 in delay circuit 36, transistor T22 is rendered conductive. The emitter of T22 and consequently the base of T6 are up. At the same time, the Y pulse has lowered the emitter of T6 to a down state, thus rendering transistor T6 conductive. As a result, the collector of T6 and consequently the base of T7 are down and T7 is rendered non-conductive. This raises the base of transistor T8 to an up level, thereby rendering transistor T8 conductive. The collector of T8 goes down, thereby bringing the emitter of transistor T17 down and T17 assumes the previously mentioned conductive state necessary for line 31 (WB) to rise to the level necessary for read and write operations. This path, resulting from the application of the X and Y signals through transistors 6, 7, 8, 17 and 18 as compared with the circuit path necessary to raise the voltage level of line 30 (WT) provides a delay sufficient so that the leading edge of high voltage pulse WB always trails the leading edge of high voltage pulse WT as shown in FIG. 3.

In order to insure that line 31 (WB) is lowered to its inactive level prior to the lowering of line 30 (WT), the Y pulse is shorter in duration than the X pulse. During the period after the Y pulse is discontinued and the X pulse is still on, circuitry is provided which insures that line 31 (WB) drops to its low voltage level before line 30 (WT) does so. This is controlled by controlling the levels at critical nodes 33 and 34. The circuitry is arranged in such a manner that node 34 cannot come down before node 33 comes up. Since it is necessary for the emitter of T17 and consequently node 33 to come up if line 31 (WB) is to come down, line 31 must come down before node 34 and consequently line 30 come down. To illustrate, when the Y pulse is removed, T6 is rendered non-conductive, thereby rendering T7 conductive since the X pulse is still being applied through transistor T22. This results in transistor T8 being rendered non-conductive, thereby raising the collector of T8 and consequently node 33 to the up state. This results in the emitter of T17 being up, rendering T17 non-conductive and T18 conductive which in turn brings WB on line 31 down. At the same time, the emitter of T10 connected to node 33 also goes up. Since the other emitter of T10 is already up because T9 is non-conductive as a result of the removal of the Y pulse, T10 is rendered non-conductive. The X pulse, which is still being applied, results in a current path through transistors 11 and 12 which brings the base of T14 up. This renders T14 conductive and consequently T13 conductive. This in turn, brings the base of transistor T15 down, turning transistor T15 off, irrespective of whether the X pulse is still on. Since node 34 is brought down, line 30 (WT) returns to its lower or inactive level.

It should be noted that once a given row is selected and the high power level is applied to activate the row, writing into and reading out of a particular cell in the activated line is accomplished in the manner described in U.S. Pat. No. 3,423,737 by the application of appropriated signals to lines 43 and 44 associated with the cell. The selection of the appropriate cell or column is accomplished by decode circuitry of the same type as decode circuitry 37 and is interconnected to the eight columns by a decoder interconnector network similar to network 24. The only difference is that instead of selecting one of sixteen lines, only one of eight lines must be selected.

There will now be described another embodiment of the true-complement generator, which is shown in FIG. 5. This generator may be substituted for the true-complement generator 20. It functions in exactly the same manner. When no pulse is being applied to terminals 50 and 51, all of the transistors are inactive and output terminals 52 and 53 are up. Thus, Wn and $\overline{Wn}$ are up. When the X pulse is applied to terminals 50 and 51 and let us assume there is a positive input on the input terminals 54, T40 and T41 are rendered conductive. T42 is non-conductive. T43 is conductive, bringing complement terminal 53 down, thereby rendering T44 nonconductive and bringing true terminal 52 up.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A bilevel powered random access monolithic memory system comprising:

a supporting substrate, an X, Y matrix of monolithic integrated semiconductor chips supported on said substrate, each of said chips comprising an array of bistable memory cells and supporting circuitry for selecting and addressing cells in said array, means for maintaining said chips in a low standby power state comprising means for applying a low bias voltage across each of the cells in each of the chips, and means for raising a selected chip in said matrix to a high power state by changing the X voltage level applied to a line of chips in the X direction and changing the Y voltage level applied to a line of chips in the Y direction to raise the chip at the intersection of the X and Y lines to the high power state, each of the cells in the chip arrays comprising a pair of transistors cross-coupled to form a bistable cell capable of storing one binary bit of information during the standby power state, said cells requiring a change in voltage level applied to the collectors and a change in voltage level applied to the emitters of said cross-coupled transistors in order to be addressed, and said supporting circuitry including connection means for utilizing the change in X voltage level and the change in Y voltage level to respectively change the voltage levels applied to the collectors and emitters of the cross-coupled transistors in the row of cells in said array selected for addressing on the selected chip to raise the voltage across each of the cells in said selected row to a higher voltage level.

2. The monolithic memory system of claim 1 wherein each of said cells comprises a pair of transistors each having two emitters, one of emitters of each transistor being connected to that of the other transistor, said change in voltage level being applied to the connected emitters.

3. A monolithic memory system comprising an integrated circuit chip comprising an array of bistable cells arranged along lines in the horizontal and vertical directions and supporting circuitry, means for maintaining the array in a low power state comprising means for applying a low bias voltage across each of the cells in each of said chips, means providing a first voltage level, means providing a second voltage level, each of the cells in the array comprising a pair of transistors cross-coupled to form a bistable cell capable of storing one binary bit of information, said support circuitry comprising a plurality of gating means, each associated with and operative to selectively connect through connecting means said first and second voltage levels to the cells along one of the lines in said array, each of said gating means being adapted to receive a binary data signal pattern input and an intermittent gating signal and to selectively connect said voltage levels to the line of storage elements associated with said gating means only upon receiving the gating signal and a preselected data signal pattern input, decoding means for receiving a pattern of binary signals representative of a selection of one of said lines in the array and for applying to the gating means associated with said selected line the preselected data signal pattern input required for the gating means to connect said first and second level to said selected line, means for simultaneously applying an intermittent gating signal to each of said gating means, and means for intermittently applying power to said decoding means for periods in correlation with the application of said gating signal whereby said gating signal and said data signal pattern inputs are coincidentally applied to said gates, said connecting means connecting said first and second voltage levels respectively to the collectors and emitters of the cross-coupled transistors in the cells of the selected line to bring said cells into the high power state, and said connecting means including delay means for delaying the application of the second voltage level until after said first voltage level has been applied and for delaying the removal of said first level until after the second level has been removed.

4. The monolithic memory system of claim 3 wherein each of the cell comprises a pair of transistors each having two emitters, one of the emitters of each transistor being connected to that of the other transistor, said second voltage level being applied to the connected emitters.

5. In a random access memory system having an array of bistable storage elements arranged along lines in the horizontal and vertical directions, addressing means for selectively applying a selected voltage level to the storage elements along one of said lines comprising:

means providing said selected voltage level, a plurality of gating means, each associated with and operative to selectively connect said voltage level to the storage elements along a different one of said lines in one of said directions, each of said gating means being adapted to receive a binary data signal pattern input and an intermittent gating signal and to selectively connect said voltage level to the line of storage elements associated with said gating means only upon receiving the gating signal coincidentally with a preselected data signal pattern input, decoding means including means for receiving a pattern of binary signals representative of a selection of one of said lines in said one direction, means, responsive to the application of an intermittent high power level input to the decoding means, for applying to only the gating means associated with said selected line the preselected data signal pattern input required for the gating means to connect said voltage level to said selected line, and means for applying, to each of said plurality of gating means, during the periods when said intermittent high power level input is not being applied, the respective preselected data signal pattern input required for each gating means to connect said voltage level to the line associated with each respective gating means, means for simultaneously applying an intermittent gating signal to each of said gating means, and means for intermittently applying a high power level input to said decoding means for periods in correlation with the application of said gating signal so that said gating signal is applied during the application of said high power level input, at which time the preselected data signal pattern required to connect said voltage level to said selected line is being applied only to the gating means associated with said selected line.

6. The random access memory system of claim 5 wherein said array is a monolithic integrated semiconductor array of a plurality of cells, each in one of two bistable states.

7. The memory system of claim 6 wherein each of the cells in said array comprises a pair of transistors cross-coupled to form a bistable cell capable of storing one binary bit of information, said selected voltage level being applied to collectors of the cross-coupled transistors in the selected line, and said system further includes means for providing a second voltage level, means controlled by said gating means, for applying said second voltage level to the emitters of the cross-coupled transistors in the selected line coincidentally with the connection of the selected level to the collectors.

said means for applying the second level including delay means for delaying the application of the second voltage level until after said selected voltage level has been applied and for delaying the removal of said selected level until after the second level has been removed.

8. The memory system of claim 7 wherein each of the cells comprises a pair of transistors each having two emitters, one of the emitters of each transistor being connected to that of the other transistor, said second voltage level being applied to the connected emitters.

9. The system of claim 6 wherein each of said gating means has a plurality of input terminal to which the binary data signal pattern input is applied and the preselected signal pattern input is one in which each of the signals applied to each of the input terminals is in the same binary state.

10. The system of claim 9 wherein the gating means are AND gates, each having a plurality of input terminals to which the binary data signal pattern input is applied and the preselected signal pattern input comprises a binary "1" applied to each input terminal.

11. The system of claim 10 wherein the decoding means comprise a plurality of true-complement generators adapted to receive a signal pattern comprising a plurality of parallel binary bits representative of the selected line to which said voltage level is to be connected, each of said binary bits being applied to a different one of said generators and each of said generators producing a two terminal output respectively representing the true applied bit and its complement and interconnection means for connecting the true output terminals and complement terminals of each generator to one of the input terminals in a different plurality of said AND gates, said true and complement output terminals being connected to AND gate input terminals in such a manner that each of the AND gates has its input terminals connected to a different combination of generator output terminals, each of said generators producing a true-complement binary output only when said power is applied to said decoding means and a binary "1" output on each of its terminals during the period when power is not being applied.

12. The system of claim 11 wherein each of said true-complement generators comprises a pair of common emitter transistors, the collector of one being connected to the base of the other whereby one of the transistors must be non-conductive when the other is conductive, the output of one of said transistor being the true output terminal and the output of the other transistor being the complement output terminal each of said transistors being non-conductive when said power is not being applied to provide a binary "1" on both the true and complement output terminals and only one of said transistors being selectively rendered conductive when said power is applied to drop the output of said transistor to a binary "0", the selection of the transistor rendered conductive being dependent on state of the binary bit rendered conductive being dependent on state of the binary bit applied to said generator.

* * * * *